United States Patent [19]

Arakelian

[11] 4,056,001
[45] Nov. 1, 1977

[54] AIR FLOW MEASUREMENT

[76] Inventor: Jack Arakelian, 2130 MacLarie Lane, Broomall, Pa. 19008

[21] Appl. No.: 757,893

[22] Filed: Jan. 10, 1977

[51] Int. Cl.² .............................................. G01W 1/02
[52] U.S. Cl. ................................................... 73/189
[58] Field of Search .............................. 73/189, 170 A

[56] References Cited

U.S. PATENT DOCUMENTS

| 3,174,336 | 3/1965 | Zrubek | 73/189 |
| 3,208,276 | 9/1965 | Wood et al. | 73/189 |
| 3,212,329 | 10/1965 | Bisberg | 73/189 |

Primary Examiner—James J. Gill
Assistant Examiner—Anthony V. Ciarlante
Attorney, Agent, or Firm—Weiser, Stapler & Spivak

[57] ABSTRACT

Quadrature positioned magnetic diaphragms are exposed to air flow which cause them to flex. Variations in reluctance of magnetic paths including these diaphragms are sensed electrically and the resulting signals processed to provide speed and direction readings.

30 Claims, 3 Drawing Figures

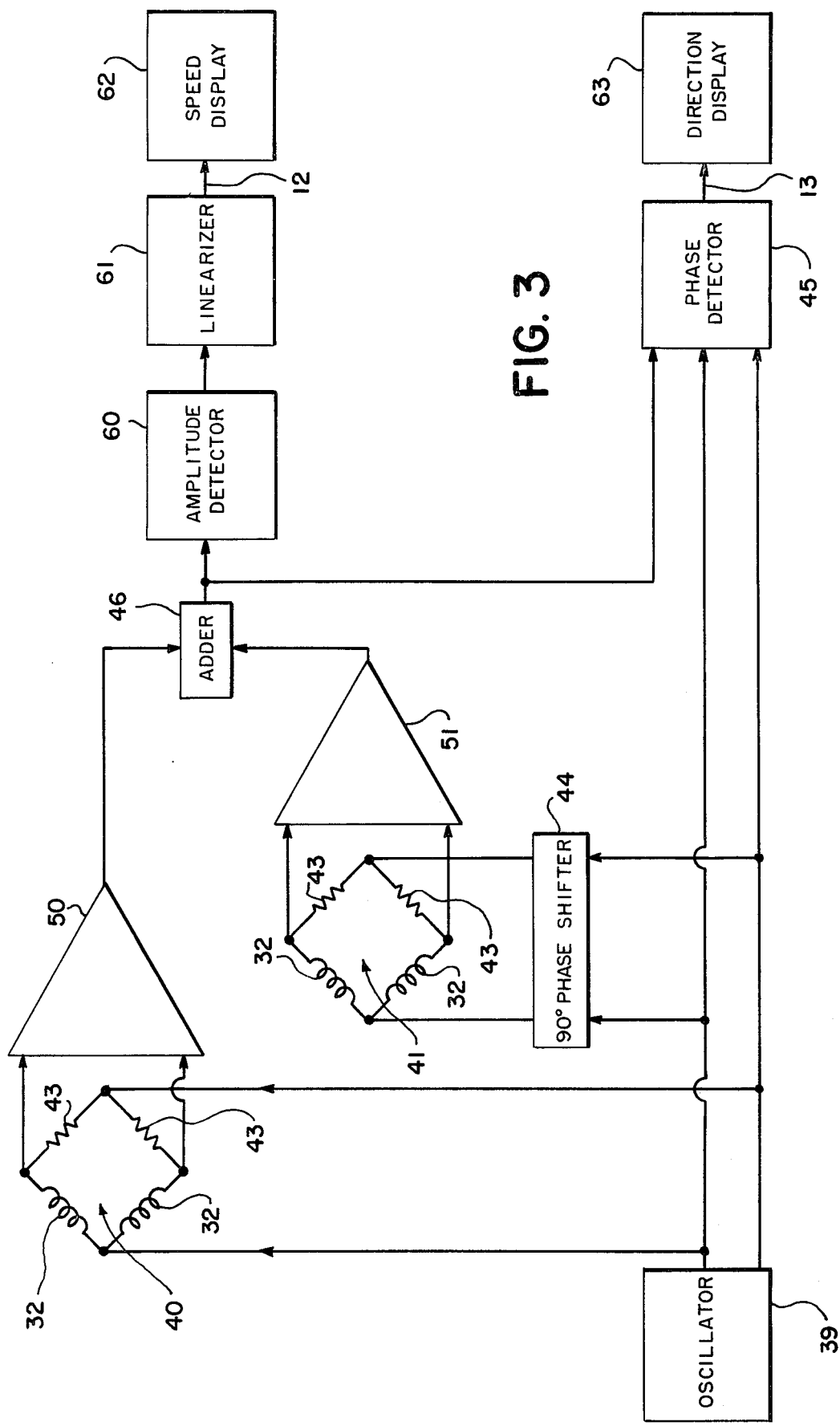

AIR FLOW MEASUREMENT

This invention relates to the measurement of certain parameters of moving gases. More particularly, it relates to the measurement of wind speed, wind direction, or both.

Various devices have been proposed for the foregoing purposes. These range from simple anemometers and weather vanes to much more sophisticated systems. Some of these have been quite successful. However, they have also suffered from various drawbacks.

To the extent that they have been technologically based upon moving parts (e.g. rotating anemometer buckets), they have suffered from all the drawbacks which are classically associated with such arrangements, especially in outdoor usage. When technology was used which did not rely on moving parts, other problems arose.

For example, so-called hot wire anemometers are known. One major problem of these is that they are not suitable for indicating wind direction; this would have to be done by some separate device, e.g. a weather vane. Also, such hot wire devices are subject to erratic performance due to ambient temperature conditions, particularly when ice forms on the wire.

Another example is a sonic system, utilizing acoustic transmission to a suitably positioned sensor array. This turns out to be bulky, heavy and correspondingly costly.

Accordingly, it is a primary object of the present invention to provide apparatus for measuring moving gases, and particularly wind speed, direction, or both, in a manner which overcomes one or more of the drawbacks of the prior art.

It is another object to provide such apparatus, which depends to a minimal extent on physical movement of component parts, and particularly of the parts exposed to the outdoors.

It is another object to provide such apparatus which is comparatively inexpensive to construct.

It is another object to provide such apparatus which is easy to calibrate and to maintain.

It is another object to provide such apparatus which is reliable and stable in operation.

These and other objects which will appear are achieved in accordance with the present invention as follows.

A sensing head is provided, for exposure to the wind to be measured. This sensing head includes a pair of diaphragms of magnetic material, positioned at an angle to each other. Wind pressure on each diaphragm deflects that diaphragm slightly, to an extent which is a function of both wind speed and direction. Magnetic cores are closely spaced from the deflectable diaphragm. Each diaphragm forms with its associated core (or cores) a magnetic circuit whose reluctance varies with diaphragm deflection. Electrical signals are derived from those magnetic circuits and processed in accordance with algorithms which yield indications of wind speed and/or direction.

For further details, reference is made to the discussion which follows, in the light of the accompanying drawings, wherein FIG. 1 is an overall, isometric view — somewhat simplified for clarity — of apparatus embodying the present invention;

FIG. 3 is a diagram, partly schematic and partly in block form, of the major electronic components of the apparatus involved in producing and processing the electrical signals.

The same reference numerals are used in the different figures to designate similar elements.

Figure 1:
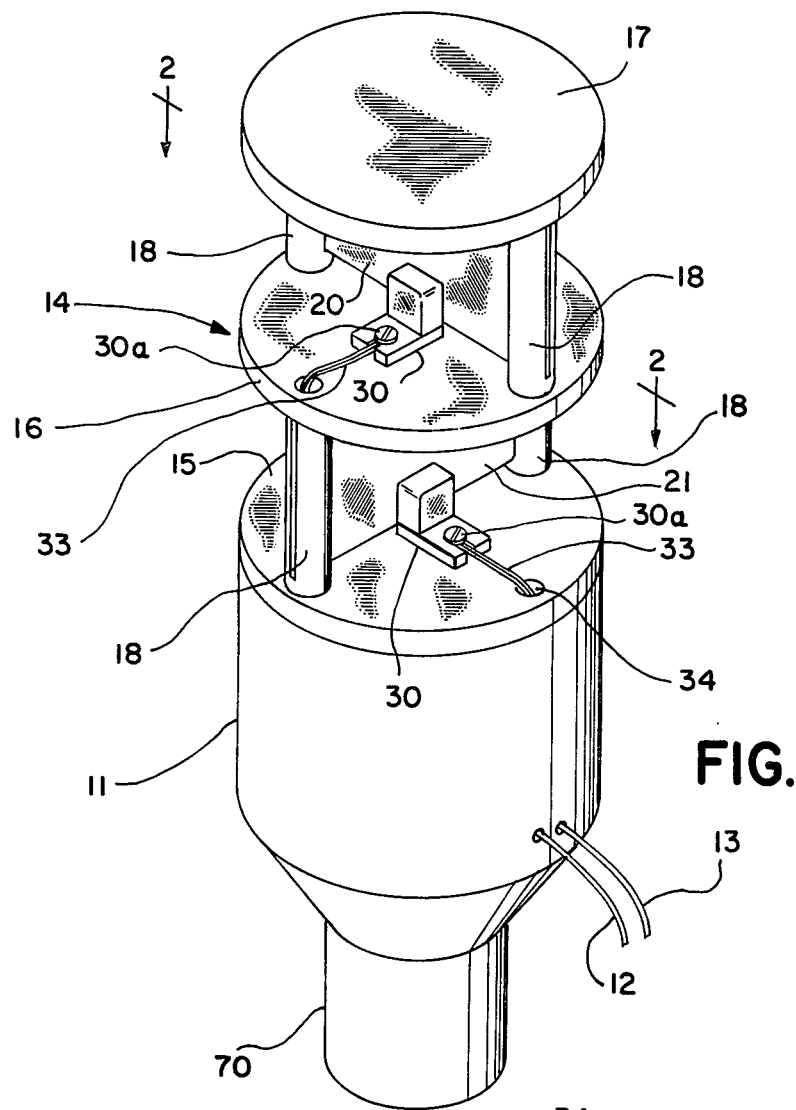

Referring to FIG. 1, this shows a generally cylindrical structure 10, of which the bottom portion 11 may be in the form of a completley enclosed cylinder from which, however, protrude two output cables 12 and 13 serving a purpose further described below.

At the upper end of cylinder 11, there is mounted a two-tier structure 14. This structure 14 forms the sensing head, defined between a pair of circular plates. One such plate, designated by reference numeral 15, may form the closed upper end of cylinder 11. The next higher plate is designated by reference numeral 16 and the topmost plate by numeral 17. Plates 16 and 17 are spaced from each other and from plate 15 by suitable support members 18 placed around the periphery of the respective plates and extending parallel to the longitudinal axis of cylindrical structure 10. Preferably, there is a pair of such supports 18 positioned diametrically opposite each other between any two of the plates, and the different pairs are displaced from each other by approximately 90° around the circular periphery of the plates, as shown in FIG. 1.

In each tier, a diaphragm is stretched between the respective pair of supports 18. Thus, in the upper tier defined by plates 16 and 17, a diaphragm 20 is stretched between supports 18. In the lower tier defined by plates 15 and 16, a similar diaphragm 21 is stretched between supports 18. It will be noted that diaphragms 20 and 21 are positioned at right angles to each other within their respective tiers.

Figure 2:
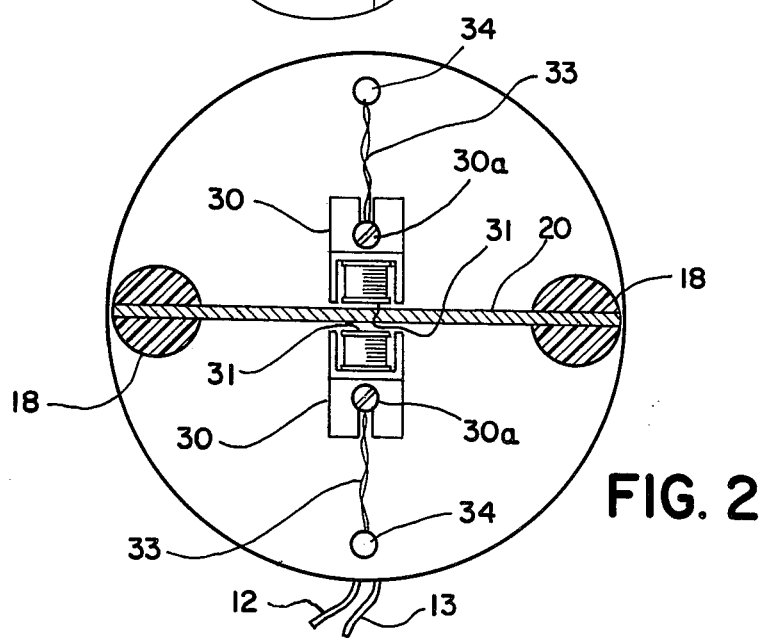
FIG. 2 is a section taken through 2—2 in FIG. 1.

Positioned adjacent each face of each diaphragm 20 and 21 is an assembly 30. The interior construction of these assemblies 30 and their positioning with respect to a diaphragm are visible in the cross-sectional view of FIG. 2. As shown in that Figure, this interior construction includes a magnetic core 31 with a coil 32, wound upon the core. This interior construction is preferably the same for all assemblies 30 in both the upper and lower tier.

The ends of each coil 32 are connected to wires 33 which connect these coils to circuitry within cylinder 11. Apertures 34 are provided in the plates defining the tiers to provide access for wires 33 to the interior of cylinder 11.

The position of each assembly 30 relative to its adjacent diaphragm is adjustable by loosening hold-down screw 30a, sliding the assembly into the desired position, and then retightening the hold-down screw.

Within cylinder 11, there are positioned electronic circuitry components as shown in FIG. 3, to which reference may now be had.

These electronic circuitry components include an oscillator 39, whose output signal is supplied to three distinct utilization means.

Two of these utilization means are bridge circuits 40 and 41, respectively. Each of these bridge circuits is formed of the two coils 32 associated with one of the diaphragms in FIG. 1. Thus, bridge circuit 40 may include the coils 32 adjacent diaphragm 20 in the upper tier of sensing head 14 of FIG. 1, while bridge circuit 41 will then include the coils 32 adjacent diaphragm 21 in the lower tier. Resistors 43 commmplete each of the bridge circuit connections.

To bridge circuit 41, the output signal from oscillator 39 is supplied, not directly, but through a circuit 44, which may be of any of a variety of conventional forms capable of shifting the phase of the oscillator output signal by 90 degrees. Thus, bridge circuits 40 and 41 are energized in quadrature phase relationship by oscillator 39.

The third utilization means for the oscillator output signal is a phase detector circuit 45. This circuit may be of any conventional form capable of producing an output signal which represents the difference in phase between two input signals. In the present instance, the other input signal to phase detector 45 is derived from an adding circuit 46, which, in turn, derives its input signals from amplifiers 50 and 51, which may take any suitable conventional form, and adding circuit 46 may also take any conventional form suitable for producing an output signal representing the algebraic sum of signals supplied thereto by amplifiers 50 and 51.

The output signal from adding circuit 46 is supplied, not only to phase detector 45, as previously stated, but also to amplitude detector circuit 60, and its detected output is, in turn, supplied to linearizing circuit 61.

The output signals from circuits 61 and 45 constitute the output from the processing circuitry within cylinder 11 (FIG. 1) and are supplied to cables 12 and 13, respectively, which issue from that cylinder.

As will be discussed below, the signal thus supplied to output lead 12 is representative of the speed of the wind to which the apparatus of FIG. 1, and particularly its sensing head 14, has been subjected. The signal produced on output lead 13, on the other hand, is representative of the azimuthal direction of this same wind, with respect to the axis of the cylindrical structure 10 of FIG. 1.

The diaphragms 20 and 21 are made of material which can be characterized as "magnetic". This does not mean that the material is magnetized, only that it exhibits the kind of low magnetic reluctance which normally causes materials to be called magnetic. For example, iron has this property, and iron is indeed suitable for diaphragms 20 and 21. However, care should be taken that the diaphragm does not have or acquire permanent magnetization. To that end, it is preferably made of a material such as stainless steel, of trade designation 430 or a metal known as Hi-Mu 80, which is an alloy having high nickel content and high initial magnetic permeability.

The enclosures of assemblies 30 are preferably made of material which prevents stray magnetic fields from affecting coils 32, so that in essence only the position of the diaphragms affects these coils. Such enclosure material may be of any suitable type, such as Hi-Mu 80. Preferably, these enclosures are also conductively grounded, to minimize stray magnetic fields from developing within them.

In operation, the signals developed in the branches of the bridge circuits 40 and 41 in response to signals from oscillator 39 will remain substantially constant, so long as diaphragms 20 and 21 are stationary. On the other hand, if wind impinging on these diaphragms causes them to flex, this will change the gap between each diaphragm and its respective associated core 31. This will change the effective reluctance of these cores and that, in turn, will manifest itself by a variation in the amplitudes of the signals developed across their respective coils 32.

Any flexure of either diaphragm necessarily causes such changes of opposite sense in its associated cores and coils. Therefore, the bridge circuit 40 or 41 associated with that diaphragm will change its state of signal distribution between the coils 32 forming two of its arms. In turn, this will change the amplitude of the signal derived from the bridge circuit and applied to amplifier 50, or 51, as the case may be.

It will be readily seen that the output signal, which adding circuit 46 produces as a result of all the foregoing, has an amplitude which is a function of the pressure exerted by the wind on the diaphragms 20 and 21, and that the phase of that same output signal is a function of the angle at which the wind impinges and thereby exerts its pressure upon the diaphragms. In turn, the wind pressure is obviously a function of its speed, and the angle is a function of its azimuthal direction.

Consequently, the output signals from amplitude detector 60 will represent the wind speed and those from phase detector 45 the wind direction. These output signals may be used to actuate suitable displays 62 and 63, respectively connected to cables 12 and 13. These may take any conventional form, such as dials, digital read-outs, and so forth.

Empirical observations have shown that the amplitude of the output signal from adding circuit 46 does not vary as a linear function of wind speed, but rather bears a pronounced non-linear relationship to such speed. Therefore, there is preferably interposed between detector 60 and display 62 a circuit 61 which compensates for this non-linearity. For example, if the relationship is square-law, then circuit 61 is a square root forming circuit. Alternatively, the display 62 may be appropriately graduated to provide a readout which conforms to the non-linearity of the output signal.

The apparatus is preferably so constructed that the bridges 40 and 41 (FIG. 3) are balanced when the wind speed is zero and the diaphragms 20 and 21 therefore undeflected.

This may be accomplished by making elements 32 and 43 of each bridge circuit physically substantially similar to each other. Small remaining variations can then be balanced out by adjusting the positions of cores 31 relative to their associated diaphragms. Such position adjustment is possible by means of the hold-down screw arrangement 30a previously discussed.

Also, further calibrating adjustments for each bridge circuit can be made by providing some variability for resistors 43. This may be accomplished in any desired manner, as for example, by making one such resistor element in each bridge in the form of an adjustable potentiometer.

Diaphragms 20 and 21 are preferably coated with a smooth substance, such as Teflon. The purpose of this is to lessen the possibility of foreign substances accumulating on the surfaces of these diaphragms 20, 21, which might interfere with their flexing under wind pressure, particularly in the same space between the adjacent coil and core assemblies 30. If the possiblity of ice formation exists, then electrical heating may also be provided for these diaphragms 20, 21. This may be conveniently accomplished by simply passing current through the diaphragms themselves.

The entire cylindrical assembly 10 (FIG. 1) may, if desired, be conveniently mounted on a pole (not shown) in order to elevate it above the surrounding terrain and expose it to the prevailing wind to be measured. In order to facilitate such pole mounting, a sleeve 70 may be provided at the lower end of assembly 10.

The diaphragms 20, 21 are preferably attached to their supports 18 by adhesives, rather than by screw type mechanical attachments. Specifically, there is preferably cut out of the pre-existing supports 18, a notch in the form of a half cylinder. The ends of the diaphragms are then placed in that notch and the portion which has previously been removed is then replaced so as to sandwich the ends of the diaphragms between the halves of the cylinder. Epoxy adhesive is used between cylinder and diaphragm on all sides. The reason for preferring this construction is that screw type attachments have a tendency to set up stresses in the diaphragms and this may distort the readings provided by the apparatus.

For similar reasons, the upper portion 14 constituting the sensing head is preferably produced with plates 15, 16 and 17 and supports 18 all molded in one piece. This too is for the sake of minimizing internal strains and stresses which might be transferred to the diaphragms 20, 21.

The frequency of oscillator 39 is by no means critical. However, the frequency should be high enough so that the "Q" of the coils remains high. A typical suitable value is ten kilohertz.

Also, many practical variants of this apparatus are possible. For example, the cylindrical portion 11 need not have the specific configuration illustrated, nor does it need to be attached directly to sensing heads 14. Instead, it may be convenient to have these two portions of the apparatus physically separated and indeed, disposed at considerable distance from each other if desired. In that event, electrical connections, are of course, provided by means of wires 33 (FIG. 2) so as to supply the signals from the coil structures 31, 32 to the signal processing circuitry.

Likewise, it is not essential that the two diaphragms be positioned in mutually quadrature relationship orientation. Other angular relationships may be used but, if so, the phase difference between the signals supplied to the two bridge circuits 40, 41 from oscillator 39 must be appropriately readjusted.

Also, it will be understood that the apparatus under consideration is not limited to the measurement of wind. It can likewise be used for the measurement of other types of gas streams, whether natural or artificial.

It is also noteworthy that in the apparatus embodying the present invention, it is conveniently feasible to reference the indication of wind orientation to a desired magnetic orientation of the device by appropriate adjustment of the phase in which the signal of output of oscillator 39 is provided. In other words, the sensing head can be positioned in any azimuthal orientation desired and, subsequently, without any further structural adjustment, the angular output readings can be made to coincide with any desired magnetic orientations by adjustment of that oscillator output signal phase.

I claim:

1. In a system for detecting and measuring the direction, or velocity, or both of gaseous currents subject to unpredictable variations, comprising:
   a sensing head to be subjected to the currents, the sensing head including a pair of substantially planar surfaces positioned at an angle to one another, and adapted to be impinged by the currents,
   each surface being of magnetic material, and each surface being subject to transverse displacement in response to impingement by the currents,
   a pair of magnetic circuit means respectively in circuit with the different surfaces, each circuit having a reluctance which varies as a function of the transverse displacement of its associated surface,
   means for electrically exciting each magnetic circuit means,
   means for deriving from each magnetic circuit-means an electric signal corresponding to the excitation as modified by the variations in reluctance, and
   means for processing the derived signals to produce an indication of the gaseous currents.

2. The system of claim 1 wherein each surface is stretched between attachments.

3. The system of claim 2 wherein the surfaces are positioned at right angles to each other.

4. The system of claim 3 wherein the surfaces are separated by a common mounting plate.

5. The system of claim 4 wherein each surface is positioned between a pair of mounting plates.

6. The system of claim 5 wherein the planes defined by the surfaces intersect substantially in the middle of the respective surfaces.

7. The system of claim 5 wherein each surface is adhesively attached to its attachment.

8. The system of claim 5 wherein the mounting plates and the attachments are of unitary molded construction.

9. The system of claim 1 wherein each magnetic circuit means includes a magnetic core positioned in proximity to its associated surface.

10. The system of claim 9 wherein the electrical exciting means includes a coil wound upon the respective core.

11. The system of claim 10 wherein the exciting means further includes an oscillator for applying an oscillatory signal to the coil.

12. The system of claim 11 further comprising means for applying the oscillatory signal to the cores associated with the respective surfaces at the same frequency but in different phases.

13. The system of claim 12 wherein the different phases are in quadrature.

14. The system of claim 13 wherein each surface has pairs of cores and coils respectively positioned on opposite sides thereof.

15. The system of claim 14 wherein each pair of coils forms part of a bridge circuit.

16. The system of claim 15 wherein the oscillatory signal is applied between two terminals of each bridge circuit, and signal deriving means are connected between the other two terminals of each bridge circuit.

17. The system of claim 16 further comprising means for additively combining electrical signals representative of the signals produced by the signal deriving means.

18. The system of claim 17 further comprising means for detecting the amplitude of the added signals.

19. The system of claim 17 further comprising means for detecting the phase of the added signals.

20. The system of claim 19 wherein the phase detecting means comprises means for detecting the phase relationship between the added signals and a signal derived from the oscillatory signal.

21. The system of claim 18 further comprising means for displaying the amplitude detected signal.

22. The system of claim 21 wherein the displaying means is calibrated in units of speed of the gaseous currents.

23. The system of claim 21 further comprising means for compensating for non-linearities of the detected signal before displaying same.

24. The system of claim 21 further comprising means for displaying the phase detected signal.

25. The system of claim 24 wherein the displaying means is calibrated in units of azimuth of the gaseous currents.

26. The system of claim 23 wherein each surface is a magnetic diaphragm.

27. The system of claim 26 wherein each diaphragm is Telfon-coated.

28. The system of claim 9 wherein each core is adjustable in position relative to its associated surface.

29. The system of claim 28 wherein each core is enclosed in a magnetic shield except where it confronts the diaphragm.

30. The system of claim 29 wherein the shields are conductively grounded.

* * * * *